United States Patent
Molloy

(10) Patent No.: US 7,440,463 B1
(45) Date of Patent: Oct. 21, 2008

(54) METHOD AND APPARATUS FOR AUTOMATIC DOCUMENT INTERCHANGE BETWEEN ELECTRONIC MAIL (E-MAIL) AND FACSIMILE (FAX) SYSTEMS

(75) Inventor: Scott Thomas Molloy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 864 days.

(21) Appl. No.: 09/767,330

(22) Filed: Jan. 22, 2001

(51) Int. Cl.
*H04L 12/28* (2006.01)

(52) U.S. Cl. .................... 370/401; 370/466; 358/401; 358/402; 358/407

(58) Field of Classification Search ............... 370/466, 370/329, 352, 356, 469, 473, 497, 529, 271, 370/353, 354, 401, 465, 467, 400; 379/81, 379/100.04, 265; 358/402, 1.15, 407, 440, 358/448, 400

See application file for complete search history.

(56) References Cited

U.S. PATENT DOCUMENTS

| | | | |
|---|---|---|---|
| 4,918,722 A | | 4/1990 | Duehren et al. |
| 5,091,790 A | * | 2/1992 | Silverberg .................. 358/434 |
| 5,291,546 A | | 3/1994 | Giler et al. |
| 5,369,686 A | | 11/1994 | Dutra et al. |
| 5,488,651 A | | 1/1996 | Giler et al. |
| 5,559,611 A | * | 9/1996 | Bloomfield et al. ......... 358/407 |
| 5,594,732 A | | 1/1997 | Bell et al. |
| 5,712,907 A | | 1/1998 | Wegner et al. |
| 5,767,985 A | | 6/1998 | Yamamoto et al. |
| 5,805,298 A | | 9/1998 | Ho et al. |
| 5,809,415 A | * | 9/1998 | Rossmann ............... 455/422.1 |
| 5,812,278 A | | 9/1998 | Toyoda et al. |
| 5,825,505 A | * | 10/1998 | Toyoda et al. ............... 358/400 |
| 5,838,683 A | | 11/1998 | Corley et al. |
| 5,946,386 A | * | 8/1999 | Rogers et al. .......... 379/265.09 |
| 6,028,679 A | * | 2/2000 | Murphy ..................... 358/407 |
| 6,157,464 A | * | 12/2000 | Bloomfield et al. ......... 358/407 |
| 6,330,070 B1 | * | 12/2001 | Toyoda et al. .............. 358/1.15 |
| 6,356,356 B1 | * | 3/2002 | Miller et al. ................ 358/1.15 |
| 6,405,244 B1 | | 6/2002 | Bando et al. ................ 709/206 |
| 6,411,685 B1 | * | 6/2002 | O'Neal ..................... 379/88.14 |
| 6,417,930 B2 | * | 7/2002 | Mori ......................... 358/1.15 |
| 6,424,426 B1 | * | 7/2002 | Henry ....................... 358/1.15 |
| 6,510,211 B1 | * | 1/2003 | McAfee et al. ......... 379/100.09 |
| 6,580,787 B1 | * | 6/2003 | Akhteruzzaman et al. ..................... 379/88.22 |
| 6,600,750 B1 | * | 7/2003 | Joffe et al. ................. 370/401 |
| 6,625,642 B1 | * | 9/2003 | Naylor et al. .............. 709/206 |
| 6,633,630 B1 | * | 10/2003 | Owens et al. ............ 379/93.24 |
| 6,640,239 B1 | * | 10/2003 | Gidwani ................... 709/203 |
| 6,650,440 B1 | * | 11/2003 | Wing ........................ 358/402 |

(Continued)

FOREIGN PATENT DOCUMENTS

WO    WO 97/18665    5/1997

*Primary Examiner*—Phirin Sam
(74) *Attorney, Agent, or Firm*—Stolowitz Ford Cowger LLP

(57) ABSTRACT

An ARPA-Internet Network Access/Service Provider device includes a fax gateway having a storage device for storing an e-mail message received from a sender through a data communication network. The stored e-mail message is converted to a fax document for transmission thereof to a fax recipient having access to a fax device. At least one fax modem device is used for transmitting the fax document to the fax recipient through a public telephone network, wherein the ARPA-Internet Network Access/Service Provider device allows a fax recipient to receive e-mail messages by the use of a fax device without requiring computer equipment.

30 Claims, 7 Drawing Sheets

U.S. PATENT DOCUMENTS

| | | | |
|---|---|---|---|
| 6,693,729 B1 * | 2/2004 | Bloomfield | 358/402 |
| 6,707,580 B1 * | 3/2004 | Bloomfield | 358/402 |
| 6,857,007 B1 * | 2/2005 | Bloomfield | 358/402 |
| 7,305,440 B1 * | 12/2007 | Saito | 709/206 |
| 2001/0015968 A1 * | 8/2001 | Sicher et al. | 370/352 |
| 2002/0075519 A1 * | 6/2002 | Konsella et al. | 358/402 |
| 2004/0073709 A1 * | 4/2004 | Bloomfield | 709/246 |
| 2004/0100648 A1 * | 5/2004 | Kulakowski | 358/1.13 |
| 2004/0218226 A1 * | 11/2004 | Antognini et al. | 358/402 |

* cited by examiner

METHOD AND APPARATUS FOR AUTOMATIC DOCUMENT INTERCHANGE BETWEEN ELECTRONIC MAIL (E-MAIL) AND FACSIMILE (FAX) SYSTEMS

BACKGROUND OF THE INVENTION

1. Field of the Invention

The present invention relates generally to electronic mail (e-mail), facsimile (fax) conversion and fax to e-mail inter-conversion so as to eliminate the need for a Personal Computer and the like for receiving e-mail messages and particularly to automatic conversion of an e-mail message, destined for a particular address by an e-mail message sender, into a fax w document for forwarding thereof onto a fax machine for use by a fax machine user and for automatic conversion of a reply fax document, developed by the fax machine user, into an e-mail message for delivery thereof to the e-mail message sender.

2. Description of the Prior Art

Communications through systems capable of transferring electronic mail (e-mail) have become particularly ubiquitous in recent years. Somewhat prior to the wide scale use of e-mail, facsimile (fax) was used as a common method of communication albeit this type of communication is clearly only a written or printed form thereof. More recently, e-mail and fax methods of communication are both employed for transferring documents of various sizes and types, simple messages and, in the case of e-mail, even voice and audio information. Some background information regarding the infrastructure behind the use of e-mail and protocols for transferring the same is briefly provided.

In FIG. 1, a prior art e-mail exchange system 10 is shown to include an Network Access/Service Provider B 17, a data communications network 14 (such as an Advanced Research Projects Agency (ARPA)-Internet), an Network Access/Service Provider A 16, a Public Switched Telephone Network 13 and a user A 18. The network 14 is comprised of switching devices, computers and their interconnections. Such devices include routers, switches, servers and other types of data networking equipment for transferring data from one computer system or location to another. The ARPA-Internet is merely an example of such a network. The Network Access/Service Provider (NASP) B 16 is shown to include an e-mail server 20 representing the computer system or network of computer systems, which provide or add infrastructure to the NASP's overall e-mail exchange capability. Typically, the e-mail service provider 20 implements some or all of the various contemporary methods prescribed by conventions, adhered to by parties wishing to interchange data on the data communications network 14. Additionally, the e-mail services provider 20 may implement policies which limit or regulate the use of, or access to e-mail services within the Network Access/Service Provider A 16 network; perhaps for the purpose of deriving revenue or for security reasons as is deemed appropriate by the Network Access/Service Provider A 16 administrative authority.

Also shown in FIG. 1 is Network Access/Service Provider B 17 that is shown to include e-mail service provider 19. For the sake of the example, each of Network Access/Service Providers A 16 and B 17 may be considered to operate autonomously under separate administrative authorities, using a similar mechanism for the provisioning of e-mail services. In this example, only users within Network Access/Service Provider A 16 are discussed, operation would be similar for users of other network administrations (not shown).

The Network Access/Service Provider A 16 may serve to isolate the network user A 18 from the characteristics of the data communications network 14. The methods used for the communication and exchange of data between a network user A 18 and the Network Access/Service Provider A 16 may differ from methods used for the delivery and receipt of network user A 18 data to and from other parties reachable via data communications network 14.

The Network Access/Service Provider A 16 may act as a broker or forwarding agent in the delivery and receipt of a network user A 18 data. The Network Access/Service Provider A 16 may act as a forwarding agent for network user A 18 data after the network user A 18 is no longer reachable on the network (e.g. a temporary network user may have terminated it's connection). Similarly the Network Access/Service Provider A 16 may act as a proxy recipient for a network user's data until such a time as that network user A 18 becomes available for receipt of that data. This mode of operation is commonly referred to as "store and forward" operation.

In FIG. 1, the network user A 18 may be an individual accessing the data communications network 14 through Network Access/Service Provider A 16 subject to access policy imposed by the Network Access/Service Provider A 16 administrative authority. In such an example, the individual network user may be employing a modem or Integrated Subscriber Digital Network (ISDN) Terminal Adapter (TA) and is 'calling' into the Network Access/Service Provider over some Public Switched Telephone Network 13 (PSTN). The network user A 18 is capable of sending or receiving e-mail in accordance with the method prescribed by Network Access/Service Provider A 16 and is setup to use e-mail service provider 20 resources for the purpose of e-mail interchange. Such an arrangement is by some prior agreement between the network user A 18 and the Network Access/Service Provider A 16 whereby the network user A 18 has given consent that Network Access/Service Provider A 16 act as a proxy on behalf of network user A 18 for e-mail interchange.

By some convention, each Network Access/Service Provider, such as Network Access/Service Provider A 16, is assigned a unique designation, by the data communication network 14 administrative authority. In ARPA-Internet terminology this designation is referred to as the domain.

Individual network users such as network user A 18 are assigned a designation by the their Network Access/Service Provider administrative authority, such as the Network Access/Service Provider A 16 administrative authority, which is unique within that Network Access/Service Provider domain. In ARPA-Internet terminology this designation is often referred to as the user name or simply 'user'.

The Network Access/Service Provider A 16 acts as an e-mail proxy agent for the set of network users, such as network user A 18, known to be administered by Network Access/Service Provider A 16. Each user, such as network user A 18, of data communications network 14 may be uniquely described by a domain designation qualified by a user designation. By convention, the given method for deriving unique e-mail designations for individuals such as network user A 18 is the merging of user with domain separated by the '@' character (yielding something of the form user@domain). In the current embodiment of the ARPA-Internet, the globally unique designation thus formed, is described in reference [RFC819 Domain naming convention for Internet user applications. Z. Su, J. Postel. Aug. 1, 1982. RFC821 Simple Mail Transfer Protocol. J. Postel. Aug. 1, 1982.], which has been adopted for use as the 'standard' e-mail address designation method and is often referred to as a network user's e-mail address.

In FIG. 1 to send e-mail to another network user, network user A 18 composes an e-mail message 22 using some method, addresses the message to the desired destination addressee (for the sake of the ARPA-Internet example this is done by embedding the destination addressee inside the e-mail message itself) and saves the message for subsequent transmission to Network Access/Service Provide A 16. On establishing a connection to Network Access/Service Provider A 16, and having satisfied the Network Access/Service Provider administrative authority access policy requirements, network user A 18 'uploads' or transfers pending e-mail message 22 from local storage to the e-mail service provider 20 in accordance with the previously agreed convention governing methods and protocols for e-mail transfer. On receipt of e-mail message 22 from network user A 18, e-mail service provider 20 typically stores the e-mail for subsequent delivery (shown as e-mail message 23 in FIG. 1) and sends a delivery acknowledgement 27 to network user A 18. On receipt of the acknowledgement from e-mail service provider 20, network user A 18 typically removes e-mail message 22, previously stored for transmission, from it's local storage facility and considers e-mail message 22 to be delivered.

The e-mail service provider 20 may receive requests to deliver e-mail from network users both within it's domain of authority and from outside it's domain of authority. Similarly, the e-mail service provider 20 may receive requests to deliver e-mail to network users both within it's domain of authority and to users outside it's domain of authority. For each e-mail message to be delivered, the e-mail service provider 20 attempts to 'deliver' the message to the e-mail service w provider specified by the destination addressee domain. In cases where the destination domain specified is other than the Network Access/Service Provider A 16 domain, the delivery attempt will result in the message being sent via the data communications network 14. Delivery attempts to destination addressee within the Network Access/Service Provider A 16 remain local to the e-mail service provider 20 network.

In FIG. 1 the destination addressee specified is a network user (not shown) in the administrative domain of Network Access/Service Provider B 17. In order to deliver e-mail message 23, e-mail service provider 20 contacts it's peer, e-mail service provider 19 in Network Access/Service Provider B 17 via data communications network 14 and 'uploads' or transfers pending e-mail message 23 to the e-mail service provider in that domain. On receipt of e-mail message 23 from e-mail service provider 20, the peer e-mail service provider 19 in Network Access/Service Provider B will typically store the e-mail for subsequent delivery (shown as e-mail message 24) and acknowledges receipt of e-mail message 23 to e-mail service provider 20. On receipt of the acknowledgement from the peer e-mail service provider 19, e-mail service provider 20 typically removes e-mail message 23, previously stored for transmission, from its local storage facility and considers e-mail message 23 to be delivered.

FIG. 2 shows the path of an e-mail message 34 originating from a network user (not shown) of Network Access/Service Provider B 17 which has the destination address set to the designation of network user A 18. The e-mail message 34 may perhaps have arrived at the e-mail service provider 19 in a manner similar to that of the case exemplified in FIG. 1 previously. On detection of pending e-mail message 34 for delivery to another administrative domain, e-mail service provider 19 contacts it's peer, e-mail service provider 20 in Network Access/Service Provider A 16 via data communications network 14 and 'uploads' or transfers pending e-mail message 34 to the e-mail service provider in that domain. On receipt of e-mail message 34 from e-mail service provider 19, the peer e-mail service provider 20 in Network Access/Service Provider A 16 will typically store the e-mail for subsequent delivery (shown as e-mail message 33) and acknowledges receipt of e-mail message 34 to e-mail service provider 19. On receipt of the acknowledgement from the peer e-mail service provider 20, e-mail service provider 19 typically removes e-mail message 34, previously stored for transmission, from its local storage facility and considers e-mail message 34 to be delivered.

The e-mail message destined for network user A 18 is saved by e-mail service provider 20 until such a time as network user A 18 is detected as reachable and available to receive e-mail. Various methods and protocols may be employed to trigger the transfer of e-mail from e-mail service provider 20 to network users such as network user A 18, commonly used approaches require users such as network user A 18 to poll or solicit for available e-mail 36 from e-mail service provider 20.

The methods and protocols used for the transfer of e-mail between network user A 18 and e-mail service provider 20 and for the interpretation and identification of source and destination e-mail addresses are governed by Network Access/Service Provider A 16 administrative authority policy.

Methods and protocols used for the transfer of e-mail between e-mail service providers in different administrative domains are defined in a body of evolutionary specifications called Request For Comments (RFC) and form the basis of the ARPA-Internet related recommendations for protocols and methods. Those methods include but are not limited to protocols and facilities such as the Post Office Protocol (POP) [RFC1725 Post Office Protocol—Version 3. J. Myers, M. Rose. November 1994.], Internet Message Access Protocol (IMAP), [RFC1730 Internet Message Access Protocol—Version 4. M. Crispin. December 1994.] and Simple Message Transfer Protocol (SMTP) RFC821 Simple Mail Transfer Protocol. J. Postel. Aug. 1, 1982 widely in use in contemporary ARPA-Internet e-mail exchange environments.

FIG. 3 shows a typical embodiment of the prior art; a NASP network environment 50 w including a connection to an external data communications network 52, a NASP A 53, a PSTN 58, and a plurality 1-U of network users 60, each capable of initiating and tearing down, on demand, a data connection to NASP A 53 over the PSTN 58. The NASP A 53 is shown to include an e-mail service provider 64, mass storage capability 62 and a plurality 1-N of interconnections to the PSTN network 58 each terminating at some PSTN interface equipment 59 such as modems or ISDN terminal adapters (TA). The e-mail service provider 64 and mass storage capability 62 may be in the form of a computer system or network of computer systems running some dedicated applications software and providing mass storage capability. The NASP A 53 is connected to the external data network 52 for the exchange of data, including e-mail data, with other foreign network users and resources (not shown). The actual methods and protocols for the exchange of data over the external data network are as defined by the regulatory and administrative authorities of data communications network 52.

In operation, the e-mail service provider 64 typically executes some purpose built or dedicated e-mail interchange software (e.g. SMTP) for the interchange of e-mail messages. In a real-world environment, the NASP administrative authority would perhaps implement some access control and network user billing policies and infrastructure to support those policies. In such an embodiment, the administrative authority through some proprietary accounting system maintained by the administrative authority would likely know each temporary network user 60. Resource usage within the NASP would perhaps be monitored on a per temporary network user 60 'account' basis and per user billing information derived accordingly.

Typically, subject to NASP administrative authority policy, each temporary network user 60 would be allocated some mass storage resource budget or quota which would serve to regulate or provide an upper limit to the amount of data maintained by the NASP on behalf of any given user.

The e-mail service provider 64 may assign a portion of the allotted mass storage of each temporary user 60, within the NASP A 53 administrative domain, for use as a users' receive mailbox. The e-mail service provider 64, stores a message destined for a temporary network user 60 in that user's assigned mailbox, until being picked up by the temporary network user 60 allocated that mailbox.

As described previously, the destination addressee for an e-mail address is associated with the e-mail message by some embodiment specific means. In the ARPA-Internet case, the evolutionary Multimedia Internet Mail Extensions (MIME) [RFC2045 Multipurpose Internet Mail Extensions (MIME) Part One: Format of Internet Message Bodies. N. Freed & N. Borenstein. November 1996; RFC2046 Multipurpose Internet Mail Extensions (MIME) Part Two: Media Types. N. Freed & N. Borenstein. November 1996; RFC2047 MIME (Multipurpose Internet Mail Extensions) Part Three: Message Header Extensions for Non-ASCII Text. K. Moore. November 1996; RFC2048 Multipurpose Internet Mail Extensions (MIME) Part Four Registration Procedures. N. Freed, J. Kiensin & J. Postel. November 1996; RFC2049 Multipurpose Internet Mail Extensions (MIME) Part Five: Conformance Criteria and Examples. N. Freed & N. Borenstein. November 1996.] specifications together with other related evolutionary definitions, e.g. "RFC822—Standard for the format of ARPA Internet text messages". D. Crocker. Aug. 13, 1982, describe methods for the encoding and interpretation of certain data items within e-mail messages for use by e-mail delivery infrastructure. Such data items identify the source and destination e-mail addresses, describe the content of the message, identify possible multiple recipients, describe cryptographic and other security measures which may be in effect together with other standard, as per the evolutionary body of RFCs, data items of significance to various members of the network community.

Typically, a useful embodiment of the current invention employs methods for confirming the transfer of an e-mail message at any transit point between peer e-mail service providers and e-mail service provider to network user e-mail exchanges. Referring to FIG. 3 if the e-mail service provider 64 receives a request to deliver an e-mail message to an unknown or non-existent user in the NASP domain, the e-mail service provider 64 creates and sends 'reply' e-mail to the originator of the message, declaring a delivery failure. In forming the deliver failure notification, the originator of the e-mail is one of the key data items typically associated with the e-mail message and is determined by the e-mail service provider 64 using contemporary methods, e.g. refer to references: [RFC822, RFC2045-2049, as recited above] If the user is known within the NASP administrative domain, and subject to NASP administrative authority policy, the received e-mail will be accepted by the e-mail service provider and saved within the mass storage quota assignment for the destination addressee (i.e. in the user mailbox) for later retrieval by the corresponding temporary network user 60 assigned that destination addressee name.

Referring still to FIG. 3, in operation, in one embodiment of the present invention, a temporary network user 60 initiates a call to a prearranged phone number within the NASP A 53. The phone call is switched via the Public Switched Telephone Network (PSTN) 58 and presented to available PSTN interface equipment 59 within the NASP A 53. On detection of an incoming call, the PSTN interface equipment 59 answers the call and attempts to identify the caller using some prearranged method.

Once the temporary network user 60 has satisfied the identification requirements imposed by the NASP A 53 administrative authority, the temporary network user 60 typically polls or solicits for any pending e-mail in the assigned name of temporary network user 60. This solicitation is performed using some prearranged protocol and is initiated at the temporary network user 60 behest. Pending e-mail is 'downloaded' from the e-mail service provider 64 mass storage capability 62 and transferred via the PSTN to the temporary network user 60 as previously described in FIG. 2. In the current embodiment, temporary network user 60 client software such as the popular Microsoft Windows 98 (and later revisions) operating system implement support for e-mail transfer using methods such as the Post Office Protocol (POP) [RFC1725, as cited above] and Internet Message Access protocol (IMAP), [RFC1730 as cited above.]

The operation of the e-mail service provider 64 together with the mass storage capability 62 may be considered to be analogous to the operation of the U.S. Post Office in that as e-mail messages arrive, they are classified by the service provider 64 based on the destination addressee and the sorted result delivered to mailboxes particular to the destination addressee, analogous to residential mail boxes, where the messages wait to be picked up by the owners of each mail box.

Various methods and protocols are employed to cater for the environmental factors which influence behavior of communications networks; factors such as data loss due to noise (say due to electromagnetic interference) and system failure have a significant impact on data communications reliability. In data communications networks, such as the ARPA-Internet, the protocols, methods and strategies employed to deal with these factors are specified in various published RFCs and other proprietary texts.

In a typical embodiment of the current invention, protocols and device control components are employed, each component being responsible for some particular aspect of a service or function within the system. The components are assembled in an ordered fashion where to perform an overall system function (e.g. to send an e-mail message), each of the components is executed in turn. When viewed as an ordered execution sequence, the component interaction forms a hierarchy. The hierarchy or 'layering' of protocols related to typical contemporary ARPA-Internet data communications as described in relevant RFCs.

In the current ARPA-Internet implementation, and in view of the reliable transport facilitated by the Transport Control Protocol [RFC793 Transmission Control Protocol. J. Postel. Sep. 1, 1981. TCP is commonly used as the transport protocol for the interchange of e-mail messages between computer systems throughout the ARPA-Internet network.

FIG. 4 shows a representations of the layering of applications level 80 components such as POP over the host (transport) level 81, which in turn is layered above the network level 82, which ultimately is layered above the link level 83. In brief, a message originating in the applications level 80, traverses through the lower levels until ultimately being passed by the link level 83 to a device level (not shown).

FIG. 5 shows a possible contemporary practical implementation of a typical temporary network user provisioning 97 where the user equipment provisioning consists of a network user Personal Computer (PC) 89 on which is installed necessary software components to support the layered functions of e-mail reader 91, POP Client 92, TCP Services 93, IPV4 Services 94, PPP Services 95, Device Control 96 and is further provisioned with a Modem or ISDN terminal adapter 90 which in turn connects to a PSTN 88.

This serves to complete a brief background of the way in which e-mail messages are transferred from one computer equipment to another using a network, such as the ARPA-Internet. The reader's attention is now drawn to some of the problems associated with such usage.

A user of e-mail must have the infrastructure, such as a PC, to support the various functions discussed with reference to FIG. 5. A user located in a remote area, such as a small shopkeeper operating in a rural area, may not have access to or desire to accrue the expense associated with investing in such an infrastructure. Secondly, even if such an infrastructure were in place, an e-mail user would have to poll his e-mail account on his pre-assigned server (through his/her NASP) in order to check for messages. This can be an expensive proposition in light of having to pay telephone toll charges for making the call and/or connection time when checking for e-mail messages. Often, the checking of e-mail yields negative results in that more often than not, there simply are no new messages. But without checking for messages and thus accruing expensive telephone calls, the user is not going to be sure of the existence of potentially urgent or important messages. The latter problem regarding telephone expenses is particularly prevalent in some countries abroad that charge substantial fees even for local telephone calls.

In summary, e-mail users generally go through a NASP for establishing an e-mail connection and for accessing the ARPA-Internet. Certain group of e-mail users, most commonly corporations, firms and other types of organizations, typically have dedicated e-mail servers positioned locally within their organization for continuous access to the ARPA-Internet and therefore e-mail. These types of users only require their NASP to provide a "pipe" to the ARPA-Internet and potentially require domain name services. Other users of e-mail require their e-mail messages to be stored by their NASP and forwarded to them upon demand. This is due to these users' not-so-permanent connections to the ARPA-Internet, yet a desire to be "virtually permanent" at least relative to the delivery of e-mail messages.

One of the limitations with the latter users' access to e-mail is that they must poll their mail boxes (provided to them by their NASP) frequently in order to determine whether or not they have any e-mail messages. The increased reliance on e-mail has resulted in a high frequency of polling for messages, which can obviously be cumbersome and wasteful in time.

Additionally, another type of users of e-mail have a desire to have access to e-mail and yet do without the infrastructure, i.e. PC, modem and other types of equipment, for accomplishing the same. Examples of such type of users are shopkeepers located in remote areas of the world, perhaps stockbrokers and others. Shopkeepers or owners of small businesses who wishes to accept e-mail orders (which has become quite common recently), may not wish to invest in dedicated hardware equipment for doing the same and would therefore be denied access to e-mail. Therefore, the problem that this group of users encounters is the acceptance of Web-based ordering with an e-mail presence and a "virtual permanent" connection for accomplishing the same without the need for any dedicated equipment other than a fax machine.

Thus, the need arises for a system and method for accepting and sending e-mail messages without the use of equipment that is in communications with the ARPA-Internet so as to reduce operating costs for small enterprises and individual ARPA-Internet users while reducing latency associated with dialing up for checking for messages.

SUMMARY OF THE INVENTION

Briefly, an Network Access/Service Provider device is disclosed in accordance with an embodiment of the present invention to include a fax gateway having a storage device for storing an e-mail message received from a sender through a data communications network. The stored e-mail message is converted to a format suitable for transmission thereof to a fax recipient having access to a fax device. At least one fax modem device is used for transmitting the fax document to the fax recipient through a public telephone network, wherein the ARPA-Internet Network Access/Service device allows a fax recipient to receive e-mail messages by the use of a fax device without requiring computer equipment.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 6:
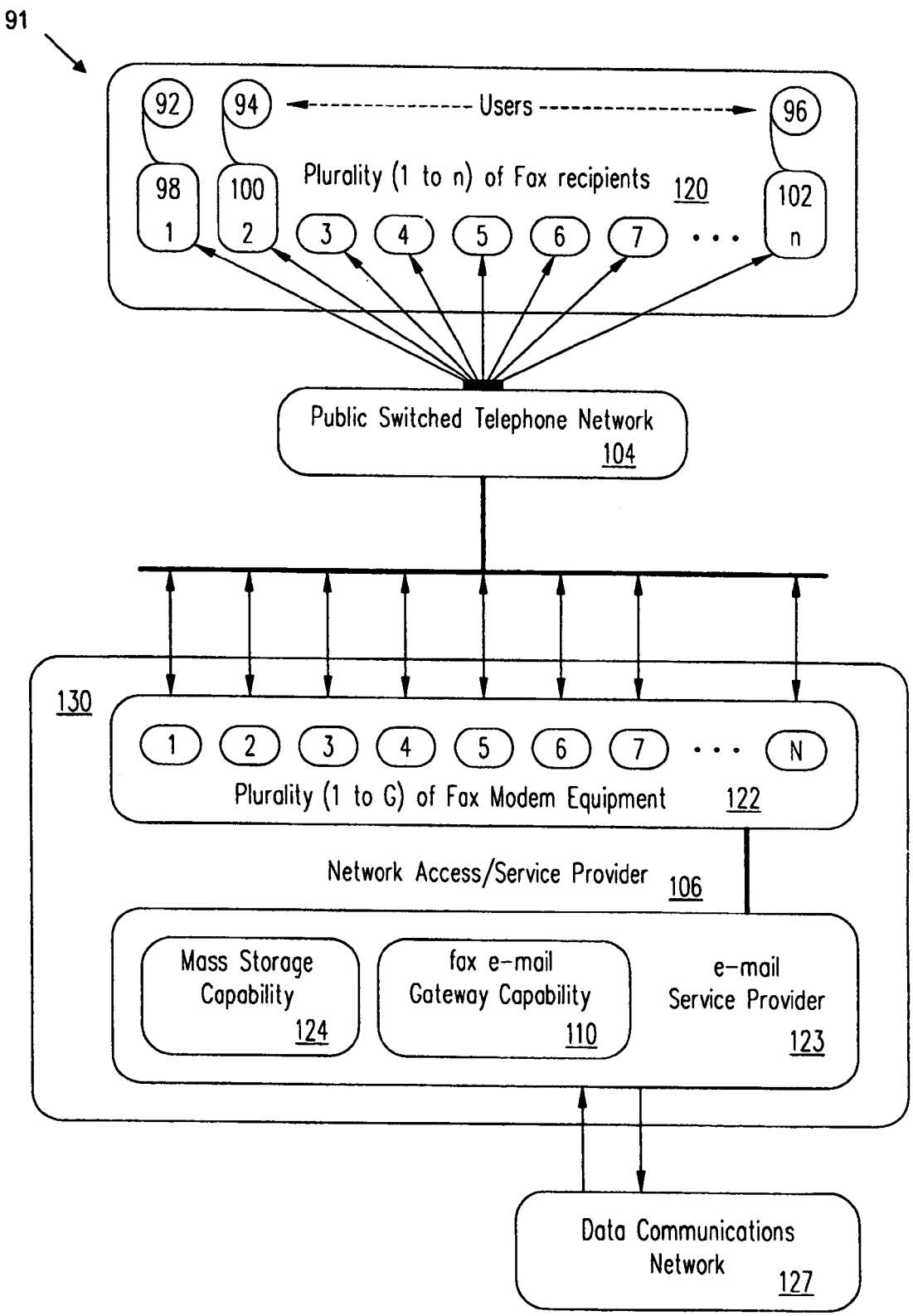
FIG. 6 shows an embodiment of the present invention to include an e-mail/fax communication system 91.

Referring now to FIG. 6, an embodiment of the present invention is shown tot include an e-mail/fax communication system 91 having an NASP device 106 coupled to a PSTN 104 and the latter coupled to a plurality of recipient fax devices 120. The plurality of recipient fax devices includes a recipient fax device 98, recipient fax device 100 and up to n number of recipient fax devices, the last one being recipient fax device 102. Each of the recipient fax devices may be employed by users. For example, the recipient fax device 98 is shown to be employed under the direction of a user 92, the recipient fax device 100 is shown to the employed under the direction of a user 94 and the recipient fax device 102 is employed under the direction of a user 96. The PSTN 104 is comprised of a typical telephone company (telco) communications structure for transferring information (in analog or digital form) between fax and/or telephone devices.

The NASP device 106 is shown to include a pool of fax capable modems 130 having a plurality I-G of fax modem devices 122 for processing calls that come in through the PSTN 104 and a mass storage device 124. The storage device 124 may be a PC with a hard disk or any other type of computer equipment with apparatus for storing information electronically. The e-mail service provider 123 within the NASP 106 is extended to include an e-mail to fax conversion gateway capability 110 which is coupled to the mass storage capability 124 and to the pool of fax capable modems 130.

The fax users, 92-96, fall within the special class of users, discussed earlier, who do not have access to e-mail yet wish to receive and send message from and to other e-mail users. Consequently, these fax users sign up with an NASP, such as America Online, Inc. In FIG. 6, they sign up with the NASP device 106 and at the time they do so, they provide their fax number and the time-of-day that they wish to receive fax documents. The latter is important to some users because their fax machine may be located in, for example, a residential area where they do not desire to be awakened by the sound of a receiving fax (out of normal business hours).

While not shown in FIG. 6, the NASP device 106 is connected to various computer equipment that are capable of sending and receiving e-mail information. The way in which any of the users 92-96 receives e-mail information in accordance with an embodiment of the present invention is as follows. An e-mail message is created and sent to e-mail service provider 123 from some network user. The e-mail is received by the e-mail service provider 123 and is stored in the mass storage capability 124 for subsequent delivery thereof, the details of which will be discussed further below. Subsequently, the e-mail message is converted to a format suitable for transmission over fax by the NASP and transmitted over the PSTN 104 to one of the fax recipients 98-102, as dictated by the fax user during initial sign-on of the user with the NASP.

Therefore, in the present invention, the NASP needs additional information that is not normally needed for prior art systems and applications. Two pieces of information that are needed are fax number for the particular fax recipient that is to receive e-mail information and (optionally) time-of-day. The latter is used to indicate the time of day at which the e-mail message contents is to be delivered to the customer and the former is clearly needed to specify the destination e-mail address of the e-mail contents. Additional information (information other than fax number and time-of-day) is optionally needed. Such options include but are not limited to:

- options to define the behavior of the system in batching multiple fax/e-mail deliveries to the same destination. This feature permits a user to receive all e-mail messages incoming into the NASP, destined for a particular user, to be sent in one batch at a nominated interval e.g. hourly, half hourly. Alternatively, a user may wish to receive e-mail without delay on its arrival at the NASP.
- options to allow the user to define a maximum acceptable page count to be printed for any particular incoming e-mail message. Users may elect this option as a security measure to avoid service denial attacks on their fax machine.
- options to allow the user to define an automated response generated and sent to the originator of any message destined for a particular user. This feature permits a user to convey a high confidence level back to e-mail originators that their e-mail will be delivered.
- Options to allow the user to control whether the user wishes to be able to receive images and other fax displayable multimedia attachments that may be present in an inbound e-mail message.
- Options to allow the user to specify the maximum number of delivery attempts that the system will try before considering a fax delivery to fail.

Upon receipt of the e-mail message, the e-mail service provider 123 checks the validity of the destination (or fax recipient) to ensure that the destination is known to the NASP. If the fax user is unknown to the e-mail service provider 123, the e-mail service provider 123 sends a standard failed message response back to the originator of the e-mail message. This is done through, for example, a Sendmail program, residing within the e-mail service provider 123, as discussed above. If the e-mail service provider 123 knows the user, the e-mail message is saved in the mailbox that is assigned to that particular user within the mass storage location 124 until the time it is transmitted by the NASP to the fax recipient at the time-of-day specified by the fax recipient.

As earlier indicated, in the present invention, a new special class of users may access the NASP. This special class of users will have provided their fax number and time-of-day information to the NASP when initially signing up with the latter. In the simplest case where the user (or fax recipient) specifies the time-of-day to be any time, the NASP device 106 converts the received e-mail to a fax document, looks up the destination fax number for the particular user to which the e-mail is intended as the recipient and creates a fax title page. Then the fax title page and the converted e-mail (fax document) are transmitted to one of the fax recipients, 98-102 at a time specified by the fax recipient's time-of-day specification.

In the fax title page, typically there is a "From:" field and a "To:" field, the latter for indicating the identity of the recipient of the message and the former for identifying the identity of the sender of the message. Additionally, there is an optional "Subject" field that generally describes the subject matter of the correspondence.

In the present invention, the "From:" field is derived from the e-mail address of the sender of the e-mail message by the NASP. The "To:" field is derived from the e-mail address of the recipient (or fax user) by the NASP and the "Subject" field is derived from the subject field of the original e-mail message.

Alternatively, if the time-of-day is defined by the customer (or fax recipient) to be other than any time and it is specified to be a time other than when the e-mail is received, then the fax is queued until the next time of day, as specified by the fax recipient to the NASP. There are two ways of queuing the message. In accordance with one method of the present invention, the e-mail message is stored in the user's mailbox as a native e-mail message. The mailbox resides in mass storage location 124. It should be noted that where a user receives multiple messages, a plurality of messages are then stored in the user's mail box. In an alternative embodiment of the present invention, the message is converted into a format suitable for transmission over fax and then stored as a graphical representation thereof. With reference to FIG. 6, this conversion is done by dedicated software within the fax e-mail gateway capability 110. The preferred method, as known to the inventor, is to store the message in e-mail rather than fax format because e-mail messages require less storage space (and also permits the user to access e-mail using either fax or conventional POP, e.g. RFCI 725 as recited above, IMAP, e.g. RFC1730 as recited above, or other like techniques.)

In the case where an e-mail user attempts to send a message to this special class of customers (fax users who do not have access to e-mail but own a fax machine and have provided their fax number to their NASP) and the message cannot for some reason be delivered to the intended recipient, a message is automatically sent to the e-mail sender informing the latter that the message could not be delivered. Thus, the sender of the e-mail message will always receive a negative confirmation of a failed message.

In accordance with the present invention, the sender of an e-mail message remains transparent to the fact that the recipient of his/her message is receiving the message in the form of a fax document rather than an e-mail message. This is so due to the recipient appearing to the sender as an e-mail recipient by virtue of having an e-mail address. In other words, when a user from the special class of users register with an NASP, they are provided with an e-mail address in the same way any other e-mail user is provided with the same. In this respect, an e-mail message sender cannot tell the difference between the classes of users to which his/her e-mail message is being sent.

One of the requirements of a useful e-mail messages system in the contemporary ARPA-Internet environment is supporting MIME [RFC2045-2049, as cited above] file attachments of various types, such as multimedia files having video and/or audio content. When receiving such an e-mail message, the fax e-mail gateway 110 tries to convert the attachment into a format renderable by a fax machine and deliver the same. Thus, multimedia information is delivered to the fax recipient faithfully. But when the attached file includes a sound track or a moving picture, the same cannot be delivered in its true form. In the latter case, the contents that can be delivered (or rendered by a fax machine) is delivered to the fax recipient in a form that is soundless and pictureless and if in doing so the message is altered in any manner, an e-mail message is sent back to the originator (or sender) of the e-mail message noting that certain parts of the sender's message could not be delivered and that if the sender desires the recipient to receive those undelivered portions to please contact the recipient in some other way. Additionally, the recipient is notified regarding the alteration of the original e-mail message when the recipient receives the fax document.

At this point, the recipient has a number of options. At the time of signing up or registering with the NASP, the recipient could have asked for an extra service from the NASP whereby messages could be opened by the NASP and listened to or viewed and if such a service was requested, the recipient may then ask to have the message listened to or viewed and to be told of its contents. Another option is to save the message in the mass storage location 124 and have the recipient pick it up by way of a computer access if one can be arranged.

Another aspect of the present invention entails sending responses from the fax recipient back to the originator of the e-mail message (sender). The reader is reminded that the fax e-mail gateway creates a fax cover (or title) page using the e-mail address of the sender and recipient to identify the information in the "From:" and "To:" fields and the subject field of the original e-mail message is used to derive the "Subject" field of the fax cover page. In this manner, when the recipient wishes to respond to the sender, the recipient uses the fax cover sheet, created by the NASP device 106, as a fax cover page for creating a response to the original e-mail message sender and attaches another document, which includes the contents of the message the recipient wishes to send to the original e-mail message sender and faxes the two as a single multi page fax document to the NASP 106. The number that the recipient uses to call the NASP is a phone number that is provided to the recipient at the time of signing up with the NASP. Thus, the NASP may provide one or more services; one service is that the NASP calls up the fax recipient whenever there is an e-mail message for the latter or at a time specified by the time-of-day criteria. Another service that may be provided by the NASP is to extend the NASP's dial-up services to include a phone number for use in replying to fax-e-mail messages.

It should be noted that currently, when a user (or customer) signs up with an NASP, the user is provided with at least one and more likely many telephone numbers that the user employs to call to check for e-mail messages. With the use of the present invention, the NASP may provide yet another number to the user for calling the NASP when the user wishes to reply to an e-mail message by sending a fax document that is ultimately converted to a reply e-mail message by the NASP and transmitted to the sender of the original e-mail message. In this respect, the user simply dials into the NASP using his/her fax machine and transmits the reply fax document.

Referring back to the example where a fax recipient sends a reply back through the NASP to the e-mail message sender, the NASP receives a multi-page fax document, the first page of which is a copy of the fax cover page that the NASP created. Upon receipt of the multi-page fax document, the fax e-mail gateway 110 executes an Optical Character Recognition (OCR) program, via which it interprets some or all of the text of the cover page of the fax document. Because the fax e-mail gateway 110 created the fax cover page in the first place, it has the requisite knowledge regarding the location, font and point size of the "Subject" field, the destination identity ("To" field) and the sender identity ("From" field) information in the fax cover page.

Thus, the NASP device 106, upon receipt of a reply fax document from on eof the fax recipients 98-102, automatically interprets the first page of the reply fax to determine to whom an e-mail message need be sent, which in this case is the original e-mail sender. It also determines who the reply fax document is from, which in this case may be identified as a normal e-mail address. The fax e-mail gateway 110 converts the remainder of the fax document into a widely recognizable graphical representation of the same (e.g. GIF, TIFF or JPEG graphics formats), creates a new e-mail message which is addressed with the information extracted from the cover page via OCR aboe, and to which it attaches tehconverted fax document, perhaps using a MIME [RFC2045-2049, as cited above] attachment type, and inserts a textual remark into th ee-mail message to indicate to the recipient that the e-mail was generated by a fax e-mail conversion gateway and that the original fax document which is being sent is reproduced in the attached (GIF, TIFF or JPEG file, to access the same, simply click on the file.) Thus, in the example of the shopkeeper as the fax recipient (one of fax recipients 98-102), the shopkeeper's response will appear as a MIME-attached "GIF" (or "TIFF" or "JPEG") file in a reply e-mail. With the use of the present invention, the shopkeeper therefore is capable of sending and receiving e-mail messages simply by using a fax machine and without the need for other computer equipment.

In FIG. 6 the e-mail service provider 123 includes a processor (or computer medium), which may be located in the fax e-mail gateway 110, and some type of mass storage area, a computer readable medium, for storing software programs for carrying out the various functions discussed herein, such as the fax-to-e-mail and e-mail-to-fax conversion and the like. This storage area is located either internally or externally in the fax e-mail gateway 110. The processor executes code from the computer readable medium for effecting the functions discussed herein.

Figure 7:
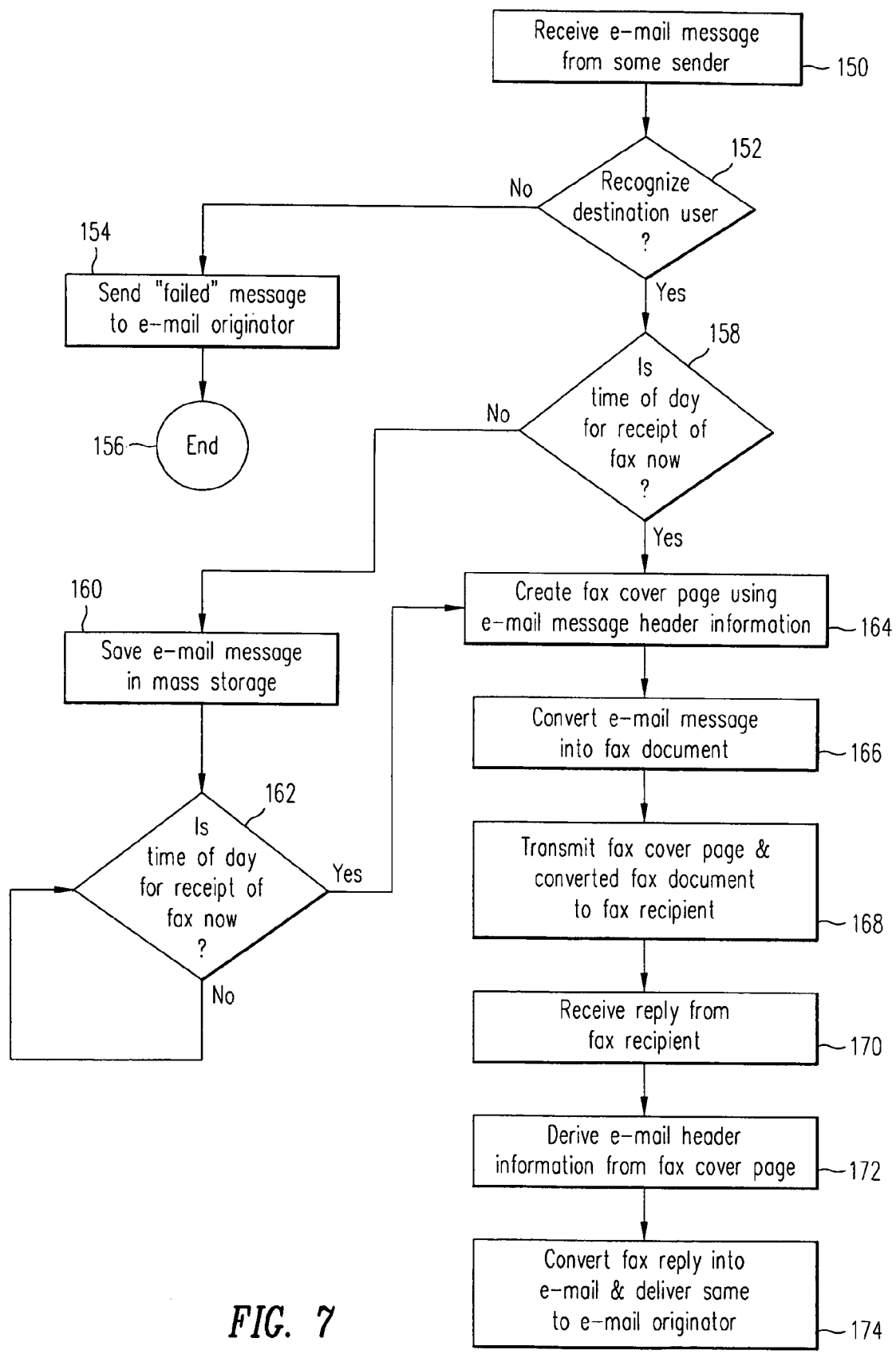
FIG. 7 illustrates the steps performed by the NASP device 106 of FIG. 4 in flow chart form.

Some of the steps performed by the e-mail service provider 123 are enumerated in flow chart format in FIG. 7. At step 150, the e-mail service provider 123 (shown in FIG. 6) receives an e-mail message from an e-mail sender. Next, at 152, the e-mail service provider 123 makes a determination as to whether or not the address of the destination (or fax recipient) is known to the NASP. If not, a failed message is sent to the e-mail sender at step 154 and the process ends at 156. On the other hand, if the identity of the destination of the e-mail message is known to the NASP device 106, at 158, the NASP determines whether or not the current time is within the window of time specified by the fax recipient as the time-of-day. If not, at step 160, the e-mail message is saved in the storage device 124 (shown in FIG. 6) and at 162, the fax e-mail gateway 110 waits the proper time within which is specified by the fax recipient and the process continues to step 164. If at 158, the time-of-day, as specified by the fax recipient, includes the current time, the process also continues to step 164.

At step 164, the NASP device 106 creates a fax cover page using the e-mail message header information. The header information is the "To:", "From:" and "Subject" fields discussed earlier. The e-mail message itself is converted into a format suitable for transmission over fax at step 166. It should be noted that the e-mail message might be converted into a format suitable for transmission over fax even prior to the creation of the fax cover page at step 164.

Figure 4:
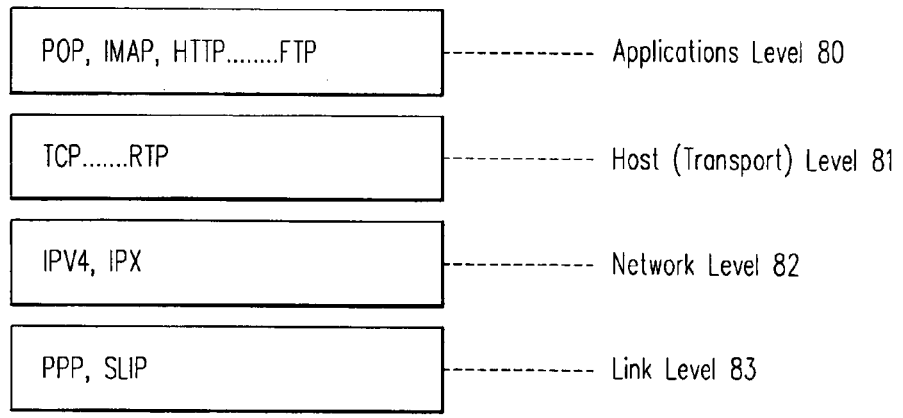
FIG. 4 shows the various layers of protocols and methods described by some ARPA-Internet RFCs related to the exchange of e-mail in contemporary ARPA-Internet environments.
Figure 5:
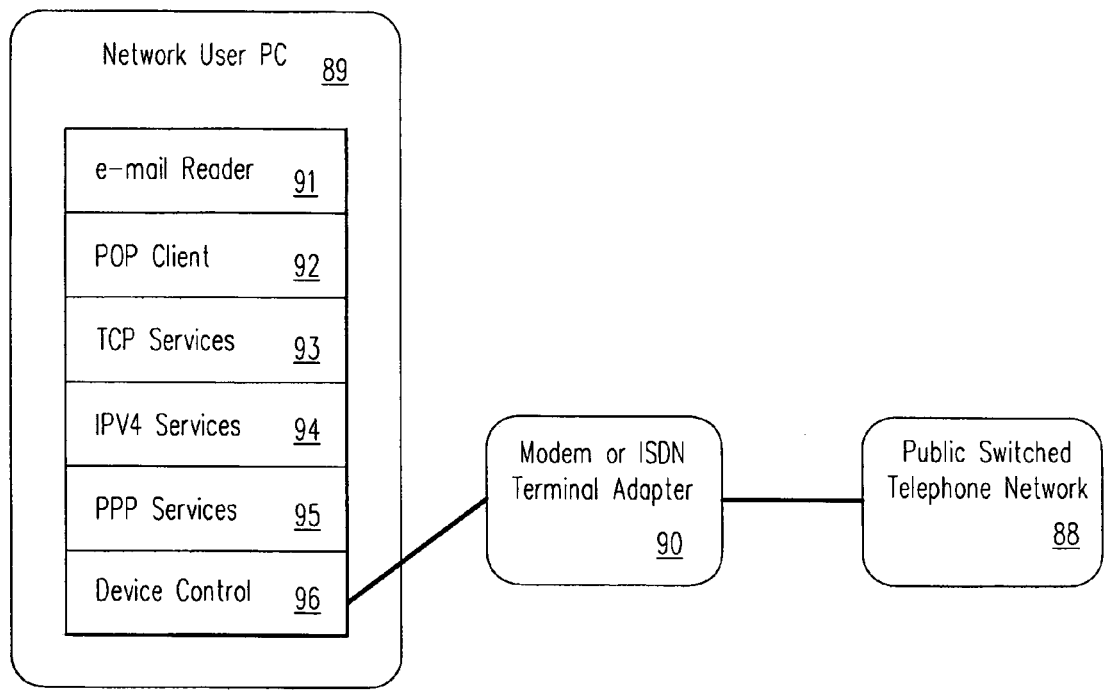
FIG. 5 shows typical temporary network user provisioning necessary for the exchange of e-mail in the prior art.

Next, at step 168, the fax cover page and the converted fax document are transmitted to their intended fax recipient (in FIG. 4, the fax recipients are any one of 98-102). After step 168, at step 170, the NASP may receive a reply fax from the fax recipient. The fax reply will include the same fax cover page that was created by the fax e-mail gateway at step 164. It should be noted that this is an optional event and the fax recipient may in fact choose not to respond. Next, at step 172, e-mail header information is derived using the fields in the fax cover page and at step 174; the fax document is converted to an e-mail message and transmitted to the e-mail sender.

If at step 166, conversion of the e-mail message results in a partial conversion due to the e-mail message having attached thereto audio or visual information that cannot be converted by the NASP device 106, as noted earlier, whatever can be converted (including alteration of the message in an attempt to preserve its contents in fax-readable form as discussed earlier) is transmitted to the fax recipient and a note is made to the latter informing them of the problem at which time the fax recipient has the option of receiving the e-mail message using a computer device to dial into the NASP to retrieve the e-mail message or can have the NASP notify the fax recipient of the contents of the message. Meanwhile, the e-mail message is stored in the mass storage capability 124. Similarly, an e-mail message is sent to the sender notifying them of the failure to deliver the e-mail message in its original form to the fax recipient. The sender may then choose to contact the fax recipient through other means. It should be noted that while the name "fax recipient" is used throughout this document that to the sender the fax recipient is known as an e-mail recipient.

Other aspects of the present invention include additional capabilities of the NASP. For example, the NASP can maintain a list of Universal Resource Locators (URLs—addresses of various ARPA-Internet sites) in its database, which may be located in the storage device 124. This list may have been one requested by the fax recipient. Every so often, again as perhaps specified by the fax recipient, the NASP may convert the URL site information into a fax document and download (or send) the same to the fax recipient. The NASP may then charge a fee for offering such a service. An example of such a service would information on the stock market. In essence the browser page of the sites requested by the fax recipient will be faxed to the latter. If the fax recipient at some point in time wishes to change his/her subscription to the sites, a fax message may be sent to the NASP indicating the same. Thus, a high degree of automation may be achieved with the method and apparatus of the present invention.

The conversion from an e-mail message to a format suitable for transmission by fax is done by the fax e-mail gateway 110 using dedicated software. This purpose built software converts a text document (an e-mail message) into an intermediate format suitable transmission by fax emulation software. One possible intermediate format, which has been found suitable for transmission by fax emulation software, is the TIFF format. The fax title page is created as a text document using fonts and point sizes recognizable by the OCR system previously described, and then converted into the intermediate format by the fax e-mail gateway for transmission as a fax document to the fax recipient. A similar program is used to convert a fax document to an e-mail message.

While embodiments of the present invention so far have shown all of the structures used by the invention in one device, namely the NASP, alternatively, these structures can be located outside of the NASP without departing from the scope and spirit of the invention. For example, all of the fax modem devices, within the plurality of the fax modem devices 122 shown in FIG. 6, may be located externally to the NASP device 106. In yet another embodiment of the present invention, some of the fax modem devices may be located within the NASP device 106 and some may be located outside of the NASP device 106.

Alternatively, the storage location 124 may be located externally to the NASP device 106 in FIG. 4. The storage location may be a place used to store some of the software programs, such as the e-mail-to-fax and fax-to-e-mail programs. Alternatively, the mail software, the user mailboxes for storage of e-mail messages and information may be stored in a storage location located outside of the NASP yet the program(s) used for the e-mail to fax and fax to e-mail conversion may be located in a storage location within the NASP in order to expedite the performance of the conversion, which is a fairly intense process and thus time-consuming. These alternatives are presented to show the flexibility of building a system in accordance with the present invention wherein a distribution of devices is facilitated.

Figure 1:
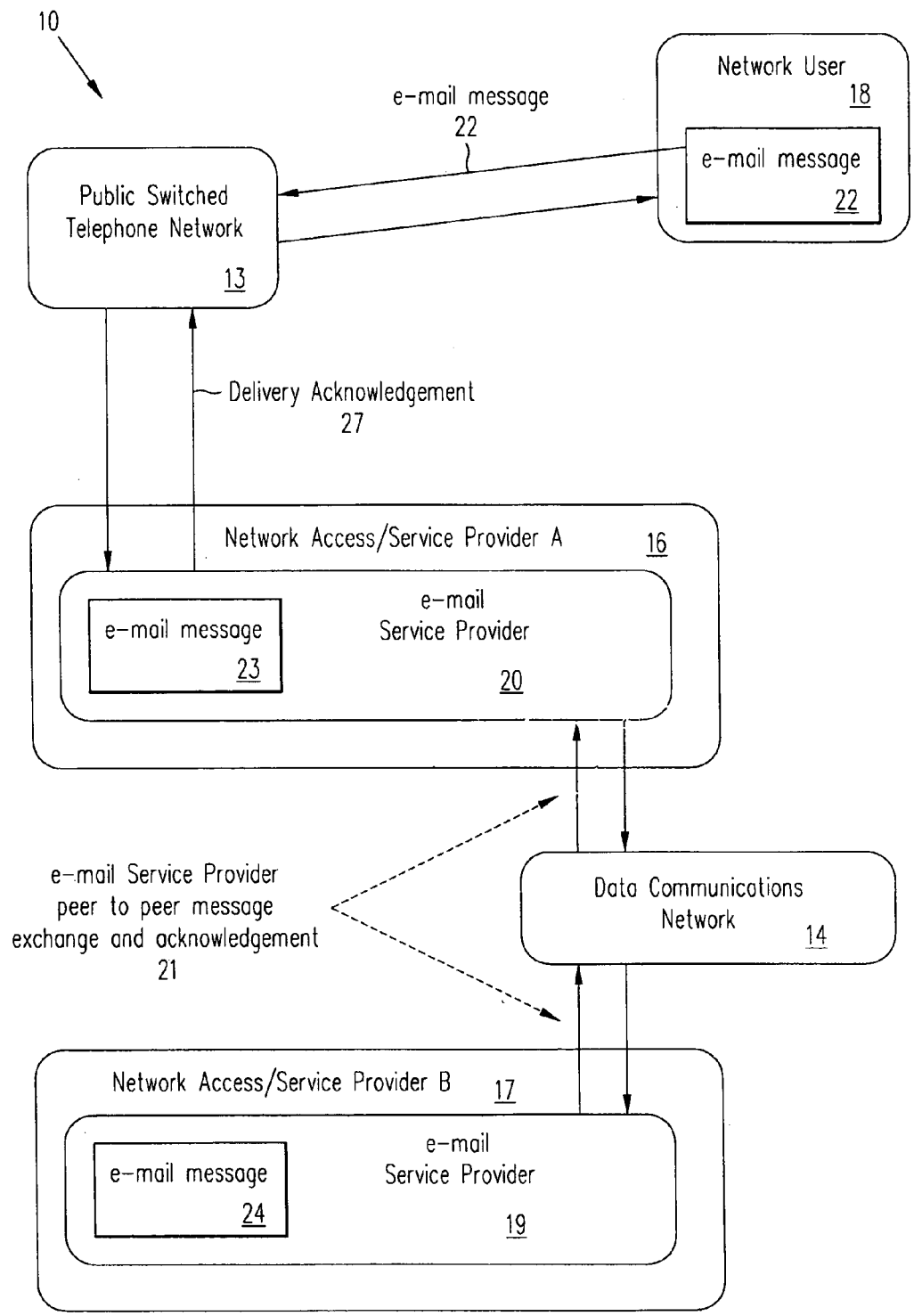
FIG. 1 and FIG. 2 show prior art e-mail exchange system 10.
Figure 2:
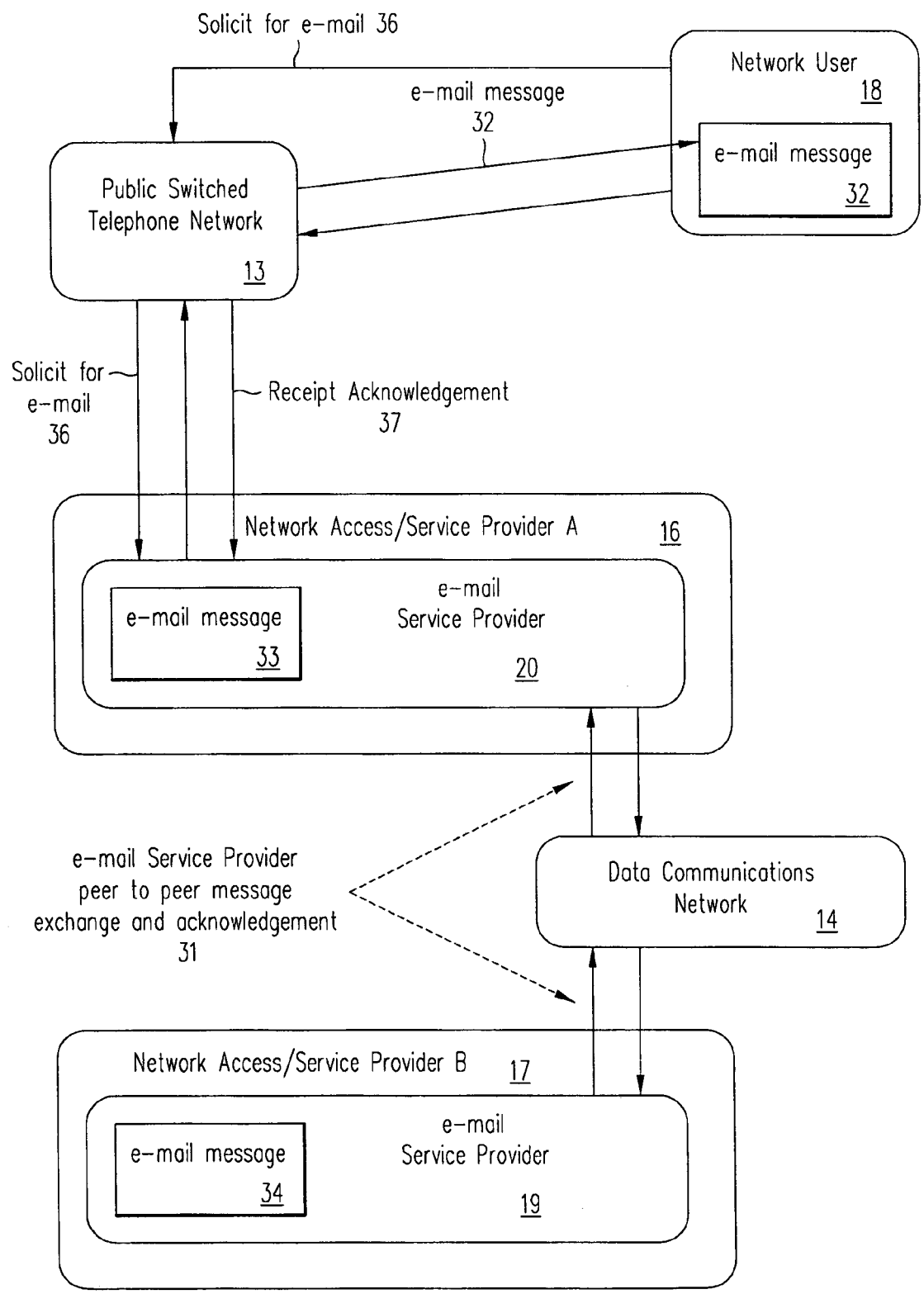
Figure 3:
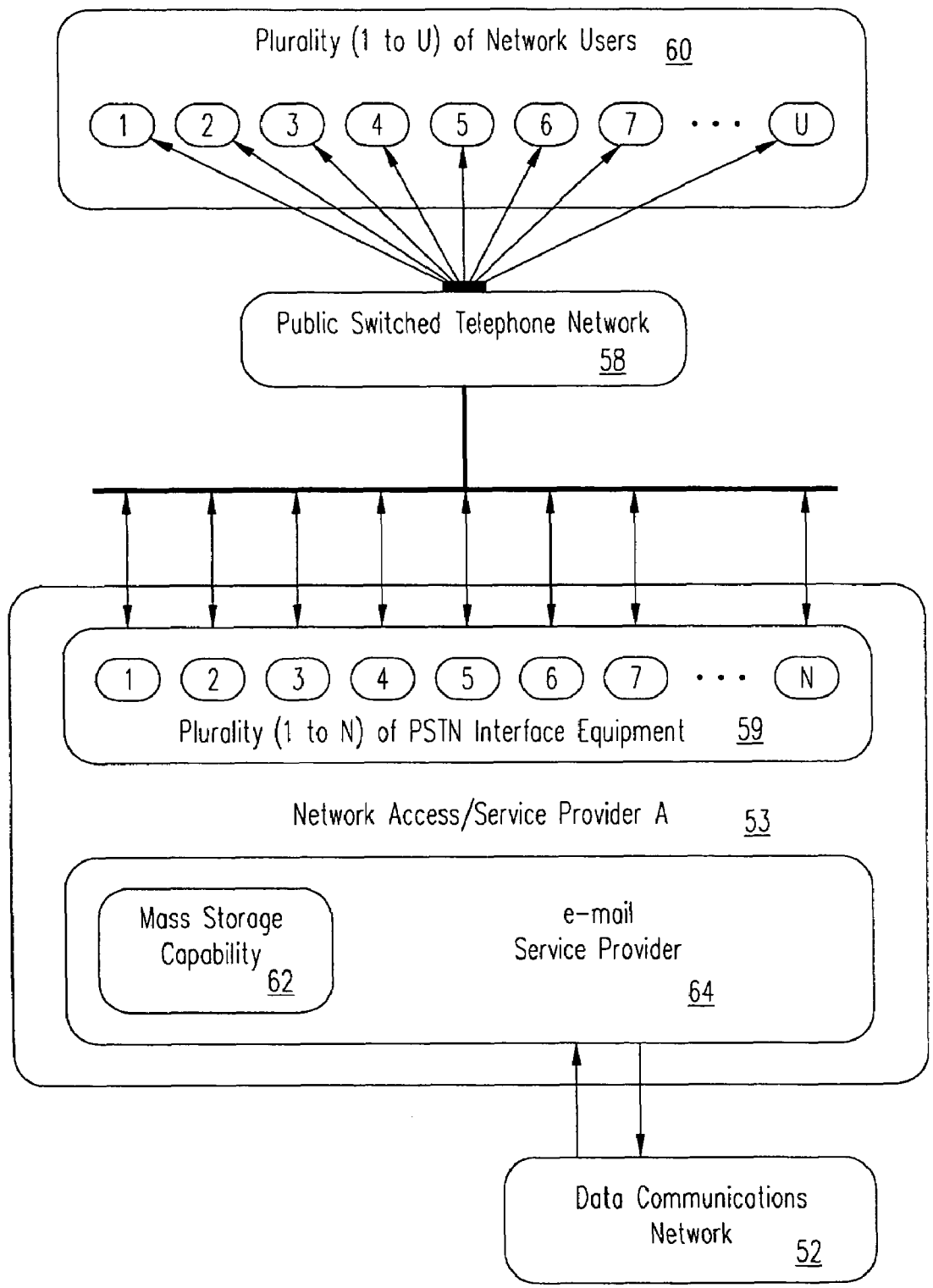
FIG. 3 shows a prior art network access/service provider network environment.

In FIG. 6, the NASP 106 communicates, through data communication network 127, with various computer equipment. From a user's perspective in FIG. 6, the fax e-mail gateway is part of the data communications network 127 (such as the one shown in FIG. 3). In FIG. 6, the plurality of fax modem devices may be included with a Network Access/Service Provider. Typically, a networking environment will include many NASPs having a plurality of fax modem devices (such as but not limited to anywhere from 1 to 10,000 fax modem devices) that are distributed all over the world but there would typically be one mailbox in one particular NASP used for storing e-mail messages for one particular user.

Figure 8:
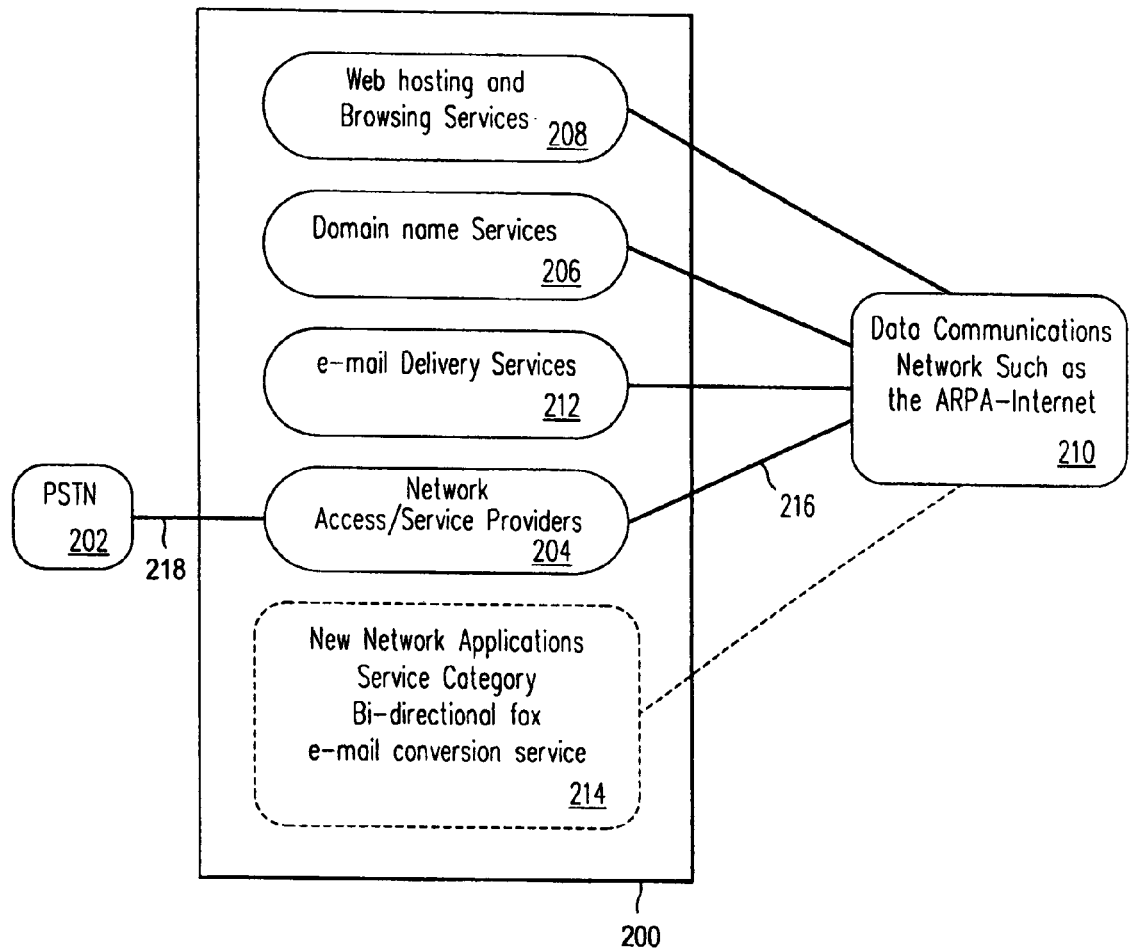
FIG. 8 depicts a networking environment 200 in accordance with an embodiment of the present invention.

In FIG. 8, a networking environment 200 is shown to include a NASP 204 in communication with an ARPA-Internet type network 210 via a data communications link 216. The communications link, in one embodiment of the present invention is an aggregated T3 Wide Area Wan (WAN) connection to an upstream service provider.

The NASP 204 is also in communication with a PSTN 202 through a communication link 218, which in one embodiment of the present invention, is a channelized T3 data stream providing up to 672 concurrent discrete low speed (64000 bits/sec) communications channels each able to be connected to a different PSTN destination simultaneously. Various computer systems communicate through the data communications network 210, with each other and with the NAS in the execution of their allotted tasks. Applications evolving within highly distributed networking environments such as the ARPA-Internet naturally tend to utilize distribution models which reflect the philosophy of the networking environment. FIG. 8 shows some of the typical services currently available on data communications networks such as the ARPA-Internet. A typical useful network provides services such as web hosting services 208, domain name services 206, e-mail delivery services 212 and network access/service providers 204. Each of the services 206, 208, 212 and 204 are provided by 'servers'—purpose built software executing on computer platforms reachable on the network. Typically, servers providing these services exist in many different locations, each dedicated to providing service to a geographical or administrative region. In this way this service is said to be distributed across multiple servers or service providers. The same can be accomplished with one apparatus. The determination as to how to distribute functionality across multiple service providers is usually based upon consideration of factors such as performance (i.e. acceptable response latency) and reliability.

The domain name server 206 either maintains or acquires information regarding the identification, i.e. ARPA-Internet Protocol address, associated with various servers using the domain name within the e-mail address field of an e-mail message. The web services server 208 maintains the ARPA-Internet browser and related functions. The e-mail services server 212 maintains the home directory information for various users. The new class of service 214 maintains information on the class of users that wish to send and receive e-mail messages using a fax machine, such as that which was extensively discussed with respect to previous figures of this patent document. This information may be the fax number of such users and the users' respective time-of-day information.

The choice of various features and services that are offered users of a particular NASP are a function of policy determined by the administrative authority of the NASP. One NASP may differentiate itself against another my offering different value additions to customers in order to attempt to increase revenue generation.

The NASP may or may not include bulk storage for the maintenance of substantially large volumes of data, in which case the mass storage requirements of a NASP may be distributed to another resource provider elsewhere in the network.

In FIG. 8, the networking environment 200 is shown to include one geographical location within which services 204, 206, 208 and 212 are included. Alternatively, the networking environment 200 may include one or more geopgraphical locations, each of which includes its own services 204, 206, 208 and 212 and one service 214 may service all of the geopgraphical locations within the networking environment 200. Furthermore, each geopgraphical location may be remotely located with respect to other geopgraphical locations.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. An Advanced Research Projects Agency (ARPA)-Internet Network Access/Service Provider device comprising:
   a fax gateway including,
      a storage device to store an e-mail message received from an e-mail sender for transmission to a fax recipient through a packet switching network, the stored e-mail message to be converted to a fax document for transmission thereof to the fax recipient;
      a database to store a fax number of the fax recipient where the fax number is to be associated with information corresponding to the e-mail message where the information corresponding to the e-mail message is independent of the fax number; and
      at least one fax modem device to transmit the fax document to the fax recipient through a public switching network, where the fax number designating the fax recipient is to be obtained separately from the e-mail message by associating the information corresponding to the e-mail message with the fax number stored in the database.

2. An ARPA-Internet Network Access/Service Provider device as recited in claim 1
   where the storage device is enabled to store a time-of-day for specifying a range of time during which the fax document is transmitted.

3. An ARPA-Internet Network Access/Service Provider device as recited in claim 1 further comprising
   a server device to store the fax number, the fax number associated with the fax device of the fax recipient, the fax number for establishing a call for the transmission of the fax document, the server device to store a time-of-day for specifying a range of time during which the fax document is transmitted.

4. An ARPA-Internet Network Access/Service Provider device as recited in claim 1 where the storage device is configured to be used to create a fax cover page for transmission thereof to the fax recipient.

5. An ARPA-Internet Network Access/Service Provider device as recited in claim 4 where the e-mail message includes an e-mail address, and the fax cover page includes a sender field extracted from the e-mail address.

6. An ARPA-Internet Network Access/Service Provider device as recited in claim 5 where the ARPA-Internet Network Access/Service Provider device assigns an e-mail address to the fax recipient, the e-mail address associated with the fax number, and where the fax cover page includes a destination field extracted from the fax recipient e-mail address.

7. An ARPA-Internet Network Access/Service Provider device as recited in claim 6 where the e-mail message includes a subject field and the ARPA-Internet Network Access/Service Provider device is enabled to include the e-mail subject field contents in the fax cover page prior to transmission thereof to the fax recipient.

8. An Advanced Research Projects Agency (ARPA)-Internet Network Access/Service Provider device comprising:
   a fax gateway including
      a storage device to store an e-mail message received from an e-mail sender for transmission to a fax recipient through a packet switching network, the stored e-mail message to be converted to a fax document for transmission thereof to the fax recipient having access to a fax device, and
      at least one fax modem device to transmit the fax document to the fax recipient through a public switching network, where a fax number designating the fax recipient is obtained separately from the e-mail; and
where the storage device is enabled to;
store the fax number, the fax number associated with the fax device of the fax recipient, the fax number to be used to establish a call for the transmission of the fax document; and
assign a home directory for storage of e-mail messages directed to the fax recipient and on receipt of the e-mail message is enabled to store the email message within the assigned home directory of the fax recipient.

9. An ARPA-Internet Network Access/Service Provider device as recited in claim 1 where the fax gateway is coupled to the public switching telephone network.

10. An ARPA-Internet Network Access/Service Provider device as recited in claim 1 where the fax gateway is coupled to the public switching telephone network through a digital communications link.

11. An ARPA-Internet Network Access/Service Provider device as recited in claim 1 where the fax gateway is coupled to the packet switching network through a digital communications link.

12. An ARPA-Internet Network Access/Service Provider device as recited in claim 1 where the storage device is a computer system having a conversion program to convert the e-mail message to a fax document.

13. An ARPA-Internet Network Access/Service Provider device as recited in claim 12 where the storage device is a computer system having an e-mail program for causing storage of the e-mail message.

14. An ARPA-Internet Network Access/Service Provider device as recited in claim 13 where the e-mail program and the conversion program reside externally to the fax gateway.

15. An Advanced Research Projects Agency (ARPA)-Internet Network Access/Service Provider device comprising:
a fax gateway including
a storage device to store an e-mail message received from an e-mail sender for transmission to a fax recipient through a packet switching network, the stored e-mail message to be converted to a fax document for transmission thereof to the fax recipient having access to a fax device, and
at least one fax modem device to transmit the fax document to the fax recipient through a public switching network, where a fax number designating the fax recipient is obtained separately from the e-mail; and
where the storage device is enabled to;
store the fax number, the fax number associated with the fax device of the fax recipient, the fax number to be used to establish a call for the transmission of the fax document; and
receive a reply fax document from the fax recipient, and is enabled to convert the reply fax document to a reply e-mail message and transmit the reply e-mail message to the e-mail sender.

16. A method for sending and receiving e-mail messages using a fax device comprising:
receiving an e-mail message through a data communications network from an e-mail sender;
converting the e-mail message into a fax document;
storing a fax number of a fax recipient in a database where the fax number is to be associated with information corresponding to the e-mail message and where the information corresponding to the e-mail message is independent of the fax number;
retrieving the destination fax number separate from the e-mail message by associating the information corresponding to the e-mail message with the fax number stored in the database; and
transmitting the fax document to the fax recipient thereby enabling the fax recipient to receive e-mail messages without access to the data communications network.

17. A method for sending and receiving e-mail messages using a fax device comprising:
receiving an e-mail message through a data communications network from an e-mail sender;
converting the e-mail message into a fax document;
retrieving a destination fax number of a fax recipient separate from the e-mail message;
transmitting the fax document to the fax recipient thereby enabling the fax recipient to receive e-mail messages without access to the data communications network;
receiving a reply from the fax recipient in the form of a reply fax document;
converting the reply fax document to a reply e-mail message; and
transmitting the reply e-mail message through the data communications network.

18. A method as recited in claim 17 further comprising:
verifying a destination user address of the e-mail message for identifying the fax recipient as being a known user.

19. A method as recited in claim 18 further comprising:
on unsuccessful verification of the destination user address, sending a failed message.

20. A computer readable medium having stored therein computer readable program code comprising instructions, if executed by a processor cause the processor to perform operations comprising:
receiving an e-mail message, from through a data communications network;
converting the e-mail message into a fax document;
storing a destination fax number of a fax recipient in a database where the fax number is to be associated with information corresponding to the e-mail message and where the information corresponding to the e-mail message is independent of the fax number;
retrieving the destination fax number separate from the e-mail message by associating the information corresponding to the e-mail message with the destination fax number; and
transmitting the fax document to the fax recipient thereby enabling the fax recipient to receive e-mail messages without access to the data communications network.

21. A device comprising:
means for receiving an e-mail message, from through a data communications network;
means for converting the e-mail message into a fax document;
means for storing a destination fax number of a fax recipient in a database where the fax number is to be associated with information corresponding to the e-mail message and where the information corresponding to the e-mail message is independent of the fax number;
means for retrieving the destination fax number separate from the e-mail message by means for associating the information corresponding to the e-mail message with the destination fax number; and
means for transmitting the fax document to the fax recipient thereby enabling the fax recipient to receive e-mail messages without access to the data communications network.

22. A device comprising:
   means for receiving an e-mail message, from through a data communications network;
   means for converting the e-mail message into a fax document;
   means for retrieving a destination fax number of a fax recipient separate from the e-mail message;
   means for transmitting the fax document to the fax recipient thereby enabling the fax recipient to receive e-mail messages without access to the data communications network; and
   means for receiving a reply from the fax recipient in the form of a reply fax document, converting the reply fax document to a reply e-mail message and transmitting the reply e-mail message through the data communications network.

23. The device of claim 22 further comprising means for verifying a destination user address for identifying the fax recipient as being a known user.

24. An ARPA-Internet Network Access/Service Provider device as recited in claim 1 where the information corresponding to the e-mail message is identified in a To field of the e-mail message.

25. A method as recited in claim 16 where the information corresponding to the e-mail message is identified in a To field of the e-mail message.

26. A method as recited in claim 16 where the converting comprises creating a fax title page.

27. A method as recited in claim 26 where a From field of the fax title page is derived from a e-mail address of a e-mail sender.

28. A method as recited in claim 16 further comprising:
   receiving a reply from the fax recipient in the form of a reply fax document;
   converting the reply fax document to a reply e-mail message; and
   transmitting the reply e-mail message through the data communications network.

29. A method as recited in claim 16 further comprising:
   verifying a destination user address of the e-mail message for identifying the fax recipient as being a known user.

30. A method as recited in claim 16 further comprising:
   on unsuccessful verification of the destination user address, sending a failed message.

* * * * *